Dec. 17, 1935.  J. I. CRABTREE  2,024,627
EDGE MARKED MOTION PICTURE FILM
Filed Jan. 26, 1934
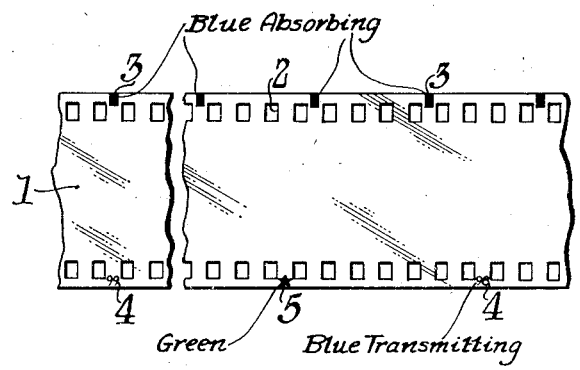
Inventor:
John I. Crabtree,
By  Newton N. Pennie
Attorney.

Patented Dec. 17, 1935

2,024,627

UNITED STATES PATENT OFFICE 2,024,627

EDGE MARKED MOTION PICTURE FILM

John I. Crabtree, Rochester, N. Y., assignor to Eastman Kodak Company, Rochester, N. Y., a corporation of New York Application January 26, 1934, Serial No. 708,473

5 Claims. (Cl. 95—1.1)

This invention relates to motion picture films and more particularly to the markings which such films sometimes bear, usually upon their margins. These markings may be the name or mark of the maker, footage numbers, spots for use with photoelectric cells to control framing, or other marks. These inscriptions are particularly needed at different times and for different purposes and the presence of one may render the use of another difficult. The purpose of the present invention is to lessen this difficulty. Since the various indicia are ordinarily observed or used under special light conditions, I propose to print the characters used for different purposes in different, and preferably complementary, colors, the colors being selected so that each character will be most readily distinguished by the light with which it is particularly useful.

Reference will now be made to the accompanying drawing, in the single figure of which is shown a motion picture film made in accordance with my invention.

The film 1 of usual type has the customary marginal perforations 2. At a fixed point with reference to each fourth perforation, that is to each frame of standard motion picture film, is a small area 3 intended to be a reference mark for manual framing. This mark is also useful in the automatic control of framing by means of a photo-electric cell at or near the gate or slit of an apparatus, such as a printer or projector; and serves to intercept the light falling upon a photo-electric cell. If the framing becomes incorrect so that the light falls on the cell, automatic means are brought into operation to correct the framing.

These marks are for this purpose of the same shape and area and variations in their area or in that portion of the area intercepting a light beam affects and controls a light sensitive cell and system. Since my invention resides solely in the film, it is not necessary to describe the apparatus further. If the cell is sensitive predominantly or solely to blue light, the beam may be monochromatic, of blue light, and the spot 3 need intercept only blue light and may be transparent to light of other colors. That is, they would be red to yellow in color (blue absorbing).

The blue and green markings will be transparent to the blue light falling on the blue sensitive photoelectric cell and, therefore, will behave like the clear film base. Similarly, by using a red scanning beam and a cell sensitive to red, the spots may be printed in blue and the other markings in red or yellow.

Upon the film are also printed footage numbers 4, which, in the case of positive film, must be visible in the yellow light of the dark room, and are, for example, blue in color. In order that the footage numbers may be readily distinguished from other marks 5 on the film, the latter may be in a third color such as green. The mark 5 is shown as a star and may be the trademark of the manufacturer or may be used for any other purpose.

The characters may be applied to the support or base or to the gelatine of the emulsion. They may be permanent colors, they may be dyes which are washed off or removed during processing or they may be decolorized during processing. Instances will now be given of dyes of these different types, all of them being known and found in the standard dye lists and catalogs. The dyes given are intended for use with a support of cellulose nitrate but formulæ suitable for any type of support can be readily selected by those skilled in this art.

For a permanent color in gelatine, a 2% aqueous solution of Victoria Blue (Heller & Merz) Schulz No. 822, Color Index No. 729, or Crocein Scarlet MOO (NA), Schulz No. 539, Color Index No. 252.

For a permanent color on the base, a 2% solution in acetone or a solvent for the film base of Victoria Blue (Heller & Merz). or Crocein Scarlet MOO (NA). In this case some nitro-cellulose may be in the solution, or other nitrocellulose lacquers may be used.

If the colors are to be removed during processing the same dyes may be used in a 1% aqueous solution, the solution also containing 1% of gum arabic or of a water soluble cellulose derivative.

The following may be used when colors which decolorize in processing are desired: Malachite Green WB, Cryst. (NA) Schulz No. 754. Color Index No. 657, or Acid Magenta (NA), Schulz No. 800, Color Index No. 692, which for gelatine may be used in a 2% aqueous solution; and for the support will be in a 2% aqueous solution containing also 1% of gum arabic or a water soluble cellulose derivative.

Numerous other formulæ are useful and the above are given merely as examples having the physical properties described. The materials in each case would be chosen in accordance with the particular requirements as regards color or the nature of the film material.

Having now described my invention, what I claim as new and desire to be secured by Letters Patent of the United States is:

1. A motion picture film having along its length series of marks useful for one purpose and another series of marks useful for another purpose, the two series of marks being of complementary color.

2. A motion picture film having along its length a series of similarly shaped colored areas, equidistantly spaced and constituting reference marks for framing, and a series of spaced colored characters indicating the length of the film, the first series absorbing light of a color which the second series transmits.

3. A motion picture film having along its length a series of similarly shaped colored areas, equidistantly spaced and constituting reference marks for framing, and a series of spaced characters indicating the length of the film, the two series being of complementary color.

4. A motion picture film having along its length a series of similarly shaped colored areas, equidistantly spaced and constituting reference marks for framing, and a series of spaced characters indicating the length of the film, the first series absorbing blue light and the second series transmitting blue light.

5. An unexposed, senstive motion picture film having perforations along its length, and having equally spaced along its length a series of similarly shaped areas similarly positioned with reference to the perforations and constituting reference marks useful in framing and a second series of characters equally spaced along the film and indicating the length of the film, the two series being colored differently from each other and differently from the color of the dark-room light used during processing whereby the two series may be readily distinguished during processing.

JOHN I. CRABTREE.